US012482016B2

(12) United States Patent
Catalano et al.

(10) Patent No.: US 12,482,016 B2
(45) Date of Patent: Nov. 25, 2025

(54) CONTENT-BASED INCENTIVE PROGRAM WITHIN MESSAGING SYSTEM

(71) Applicant: Snap Inc., Santa Monica, CA (US)

(72) Inventors: Jacob Catalano, Burlington (CA); Yu Wang, Mill Valley, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/053,683

(22) Filed: Nov. 8, 2022

(65) Prior Publication Data

US 2023/0214875 A1 Jul. 6, 2023

Related U.S. Application Data

(60) Provisional application No. 63/295,100, filed on Dec. 30, 2021.

(51) Int. Cl.
| | | |
|---|---|---|
| *G06Q 30/00* | (2023.01) | |
| *G06Q 30/0207* | (2023.01) | |
| *G06Q 50/00* | (2012.01) | |
| *H04L 51/52* | (2022.01) | |
| *G05B 19/418* | (2006.01) | |

(52) U.S. Cl.
CPC ......... *G06Q 30/0239* (2013.01); *G06Q 50/01* (2013.01); *H04L 51/52* (2022.05)

(58) Field of Classification Search
CPC .... G06Q 30/0239; G06Q 50/01; H04L 51/52; H04L 51/214
See application file for complete search history.

(56) References Cited

U.S. PATENT DOCUMENTS

| | | |
|---|---|---|
| 11,468,414 B1 | 10/2022 | David et al. |
| 2007/0244570 A1* | 10/2007 | Speiser ............... G06Q 50/10 700/1 |
| 2014/0278968 A1 | 9/2014 | Strompolos et al. |
| 2015/0302886 A1 | 10/2015 | Brock et al. |
| 2016/0283936 A1 | 9/2016 | Daniel et al. |

(Continued)

OTHER PUBLICATIONS

"Take One Get One Free": Leveraging P2P Networks for Content Promotion. IEEE. 2008. (Year: 2008).*

(Continued)

*Primary Examiner* — Maria V Vanderhorst
(74) *Attorney, Agent, or Firm* — Schwegman Lundberg & Woessner, P.A.

(57) ABSTRACT

Aspects of the present disclosure involve a system comprising a computer-readable storage medium storing a program and method for providing a content-based incentive program. The program and method provide for receiving, from a device, a request for submitting a media content item to a content feed associated with an incentive program providing for user payout based on meeting content criteria; determining that the media content item meets the content criteria; adding the media content item to a set of media content items which meet the content criteria and which are available via the content feed; providing access to the media content item in association with the content feed; selecting, based on the providing and at least in part on viewer engagement, the media content item from among the set of media content items for the user payout; and providing, based on the selecting, the user payout to the user.

18 Claims, 12 Drawing Sheets

(56) References Cited

U.S. PATENT DOCUMENTS

| | | | |
|---|---|---|---|
| 2017/0075894 A1 | 3/2017 | Poornachandran et al. | |
| 2018/0300916 A1* | 10/2018 | Barnett | G06Q 10/10 |
| 2020/0065853 A1* | 2/2020 | Cvinar | H04N 21/2743 |

OTHER PUBLICATIONS

"Tamper-Proof Incentive Scheme for Mobile Crowdsensing Systems". IEEE.2018. (Year: 2018).*

"U.S. Appl. No. 17/529,811, Examiner Interview Summary mailed Dec. 2, 2024", 2 pgs.

"U.S. Appl. No. 17/529,811, Final Office Action mailed Mar. 18, 2024", 17 pgs.

"U.S. Appl. No. 17/529,811, Final Office Action mailed Dec. 31, 2024", 21 pgs.

"U.S. Appl. No. 17/529,811, Non Final Office Action mailed Aug. 27, 2024", 17 pgs.

"U.S. Appl. No. 17/529,811, Non Final Office Action mailed Sep. 26, 2023", 15 pgs.

"U.S. Appl. No. 17/529,811, Response filed Jun. 13, 2024 to Final Office Action mailed Mar. 18, 2024", 11 pgs.

"U.S. Appl. No. 17/529,811, Response filed Nov. 27, 2024 to Non Final Office Action mailed Aug. 27, 2024", 14 pgs.

"U.S. Appl. No. 17/529,811, Response filed Dec. 19, 2023 to Non Final Office Action mailed Sep. 26, 2023", 11 pgs.

Clifford, Chi, "YouTube Algorithm: The Constantly Updated Guide to YouTube's Updates & Changes", [Online]. Retrieved from the Internet: <https://blog.hubspot.com/marketing/youtube-algorithm>, (Dec. 11, 2018).

"U.S. Appl. No. 17/529,811, Non Final Office Action mailed Apr. 14, 2025", 22 pgs.

"U.S. Appl. No. 17/529,811, Examiner Interview Summary mailed Jul. 10, 2025", 2 pgs.

"U.S. Appl. No. 17/529,811, Response filed Jul. 14, 2025 to Non Final Office Action mailed Apr. 14, 2025", 12 pgs.

"U.S. Appl. No. 17/529,811, Examiner Interview Summary mailed Sep. 30, 2025", 2 pgs.

"U.S. Appl. No. 17/529,811, Final Office Action mailed Jul. 31, 2025", 12 pgs.

"U.S. Appl. No. 17/529,811, Response filed Oct. 23, 25 to Final Office Action mailed Jul. 31, 2025", 15 pgs.

Ryan, Taylor, "How Gen Z and Millennials Watch Video Content & What That Means For Production Teams", <https://www.rev.com/blog/how-gen-z-and-millennials-consume-video-content-what-that-means-for-production-teams>, (Jan. 15, 2020).

* cited by examiner

CONTENT-BASED INCENTIVE PROGRAM WITHIN MESSAGING SYSTEM

CROSS-REFERENCE TO RELATED APPLICATION

This patent application claims the benefit of U.S. Provisional Patent Application No. 63/295,100, filed Dec. 30, 2021, entitled "CONTENT-BASED INCENTIVE PROGRAM WITHIN MESSAGING SYSTEM", which is incorporated by reference herein in its entirety.

TECHNICAL FIELD

The present disclosure relates generally to a messaging system, including providing a content-based incentive program within a messaging system.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

A messaging system typically allow users to exchange content items (e.g., messages, images and/or video) with one another in a message thread. A messaging system may implement one or more content feeds for surfacing media content to end users.

The disclosed embodiments provide for a messaging system which implements an incentive program. The incentive program is intended to promote or encourage users to submit media content to a content feed. A user submits a media content item to the content feed, for entry into the incentive program. The content feed includes different incentives (e.g., payouts) for different types of content. For example, each incentive has predefined content criteria for submitting an entry, and each incentive may pay out a different monetary amount. Thus, the submitting user also selects a particular incentive for the submitted media content item, for example, based on the content within the media content item.

The predefined content criteria is specified by an administrator or administrative body responsible for creating the incentive. The content criteria may require that submitted media content items apply use one or more of a particular augmented reality content item (e.g., Lens), a third-party app, a geo-location and/or a sound file (e.g., song). The messaging system is configured to determine if a submitted media content item meets the content criteria requirements for the selected incentive (e.g., user payout), and if so, to update the submissions (e.g., an existing set of media content items) to include the submitted media content item.

After the submitted media content item has been added to the set of media content items, the messaging system provides an interface that makes the media content items available (e.g., as selectable icons) within that set of media content items. Based on viewer engagement with respect to the submitted media content item (e.g., relative to the remaining media content items), the messaging system may determine that the submitted content item qualifies for user payout. The messaging system provides for such payout to the user.

Figure 1:
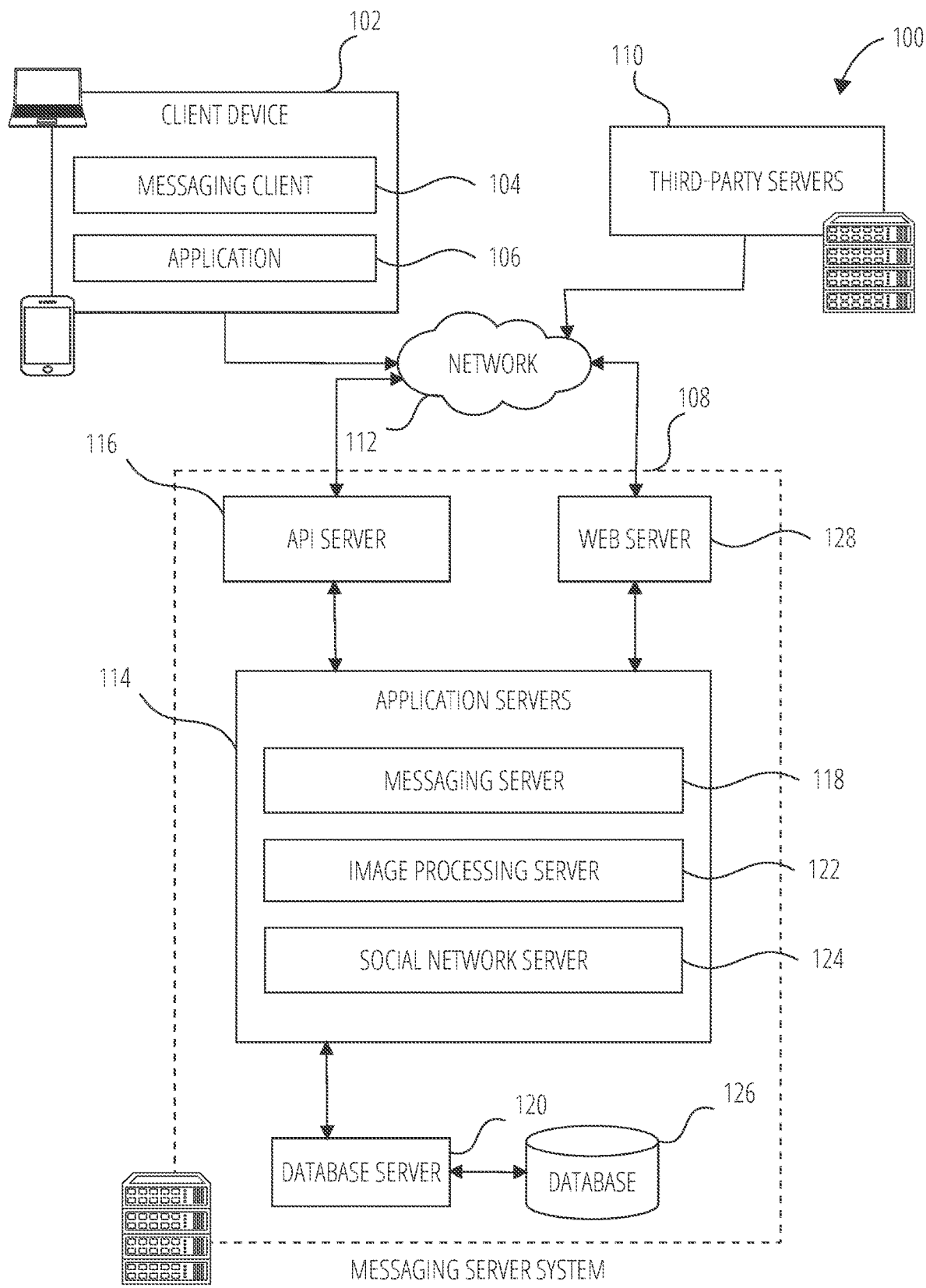
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
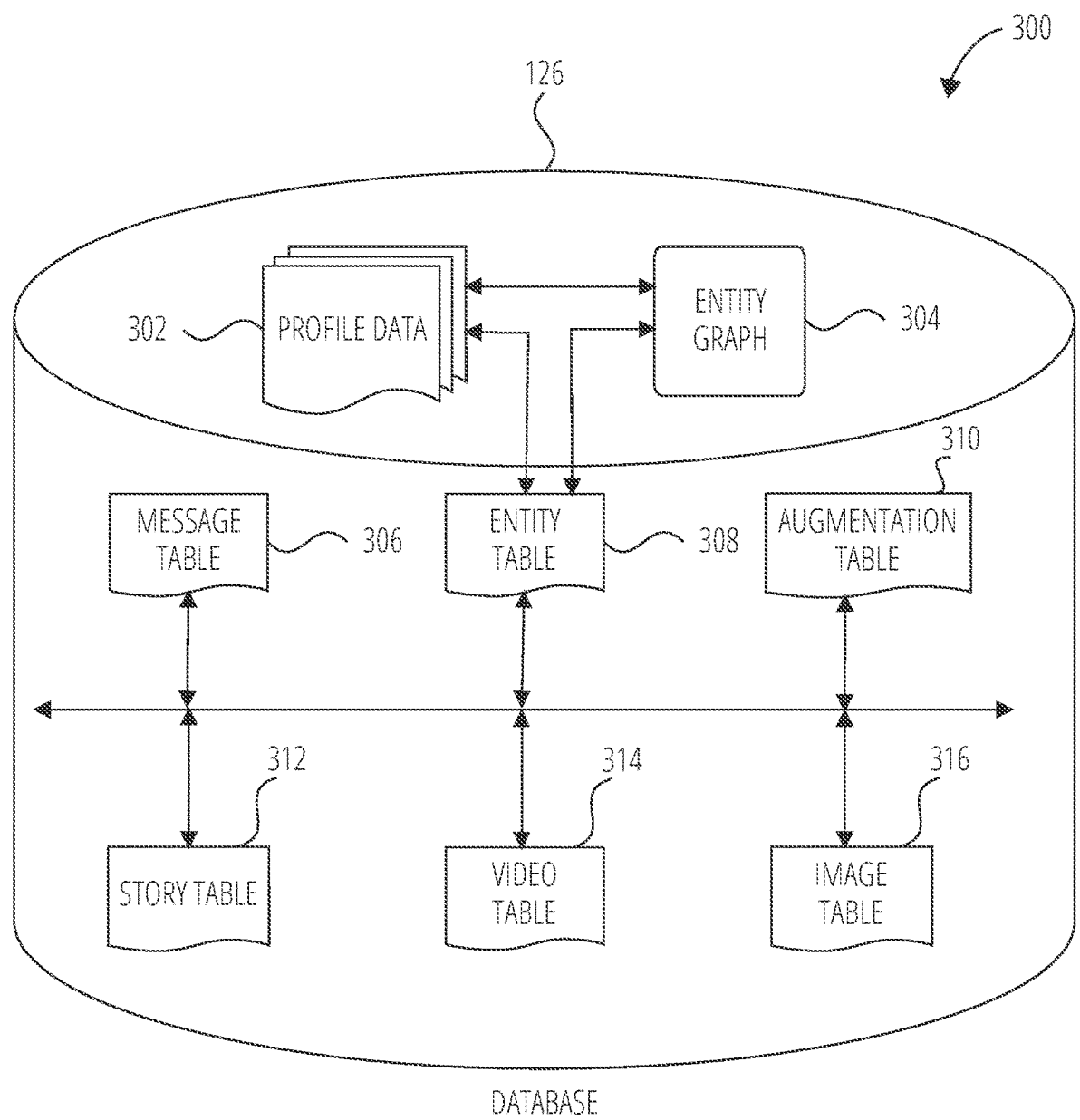
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
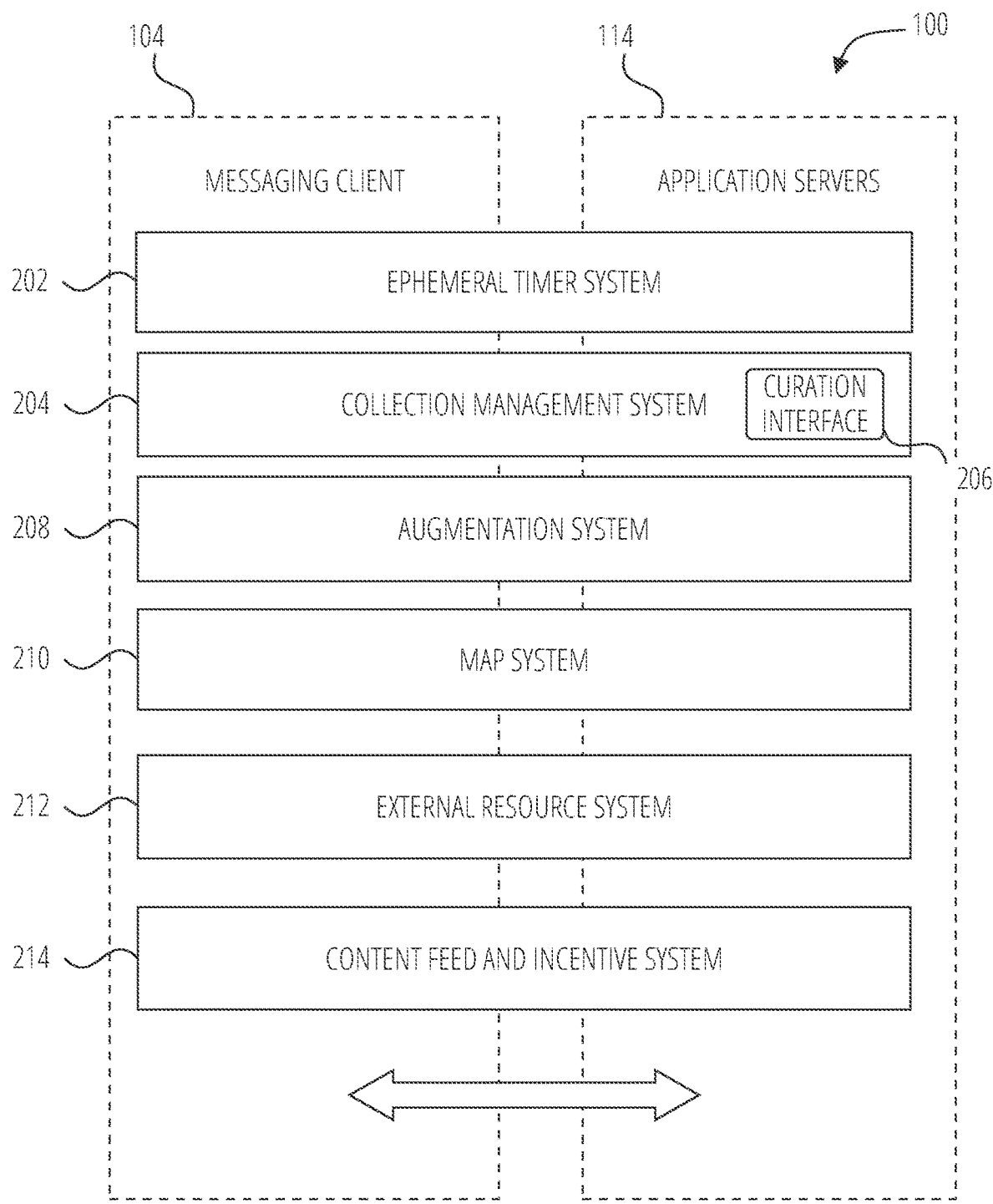
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, an external resource system 212, and a content feed and incentive system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video. To facilitate the presentation of augmented reality content, the augmentation system 208 may implement or otherwise access object recognition algorithms (e.g., including machine learning algorithms) configured to scan an image or video, and to detect/track the movement of objects within the image or video.

The map system 210 provides various geographic location functions, and supports the presentation of map-based media content and messages by the messaging client 104. For example, the map system 210 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The content feed and incentive system 214 implements various functions for providing a content-based incentive program within the context of the messaging system 100. The incentive program promotes or encourages a particular type of action, within a time period for eligibility, by users of the messaging system 100. In one or more embodiments, the incentive program promotes or encourages users to submit media content (e.g., media content items or content collections) for a particular incentive (e.g., associated with predefined augmented reality content, third-party app content, geo-location, and/or sound content), within a time period for eligibility, to a content feed implemented by the messaging system 100. The content feed and incentive system 214 provides for submitting users to become eligible for the incentive (e.g., a monetary reward) based on how popular their submitted media content becomes.

Examples of functions implemented by the content feed and incentive system 214 include, but are not limited to: receiving user submissions for the content feed; determining if submissions meet content criteria; determining popularity of media content items submitted to the content feed, for example, by tallying a number of qualified views for each of the media content items; determining payout eligibility for the media content item based on its number of qualified views; performing compliance with respect to content rights of media content item(s); performing compliance with respect to user payment requirements of user(s); and providing user payout (e.g., in conjunction with a third-party payment system) to user(s).

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

Figure 4:
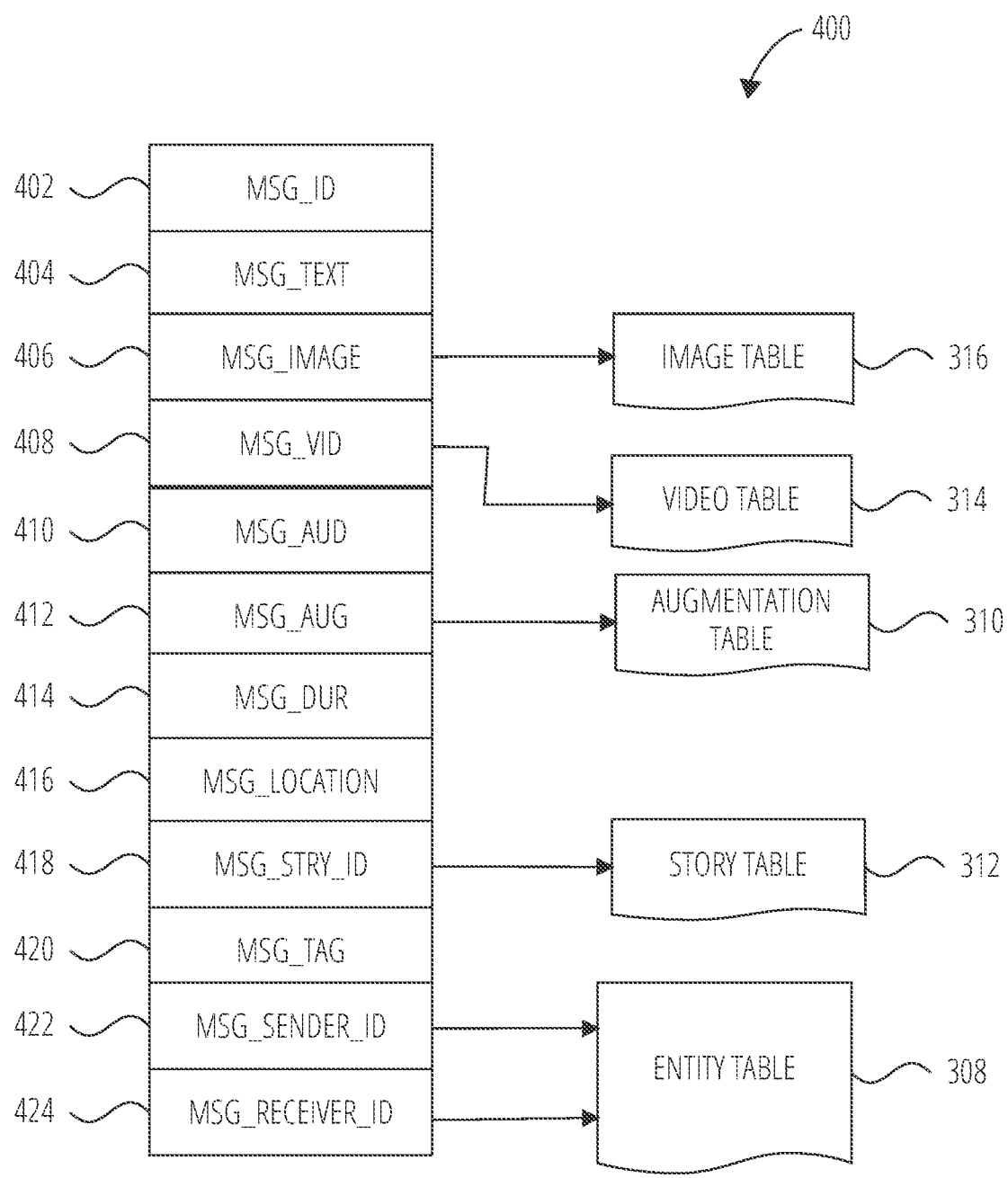
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
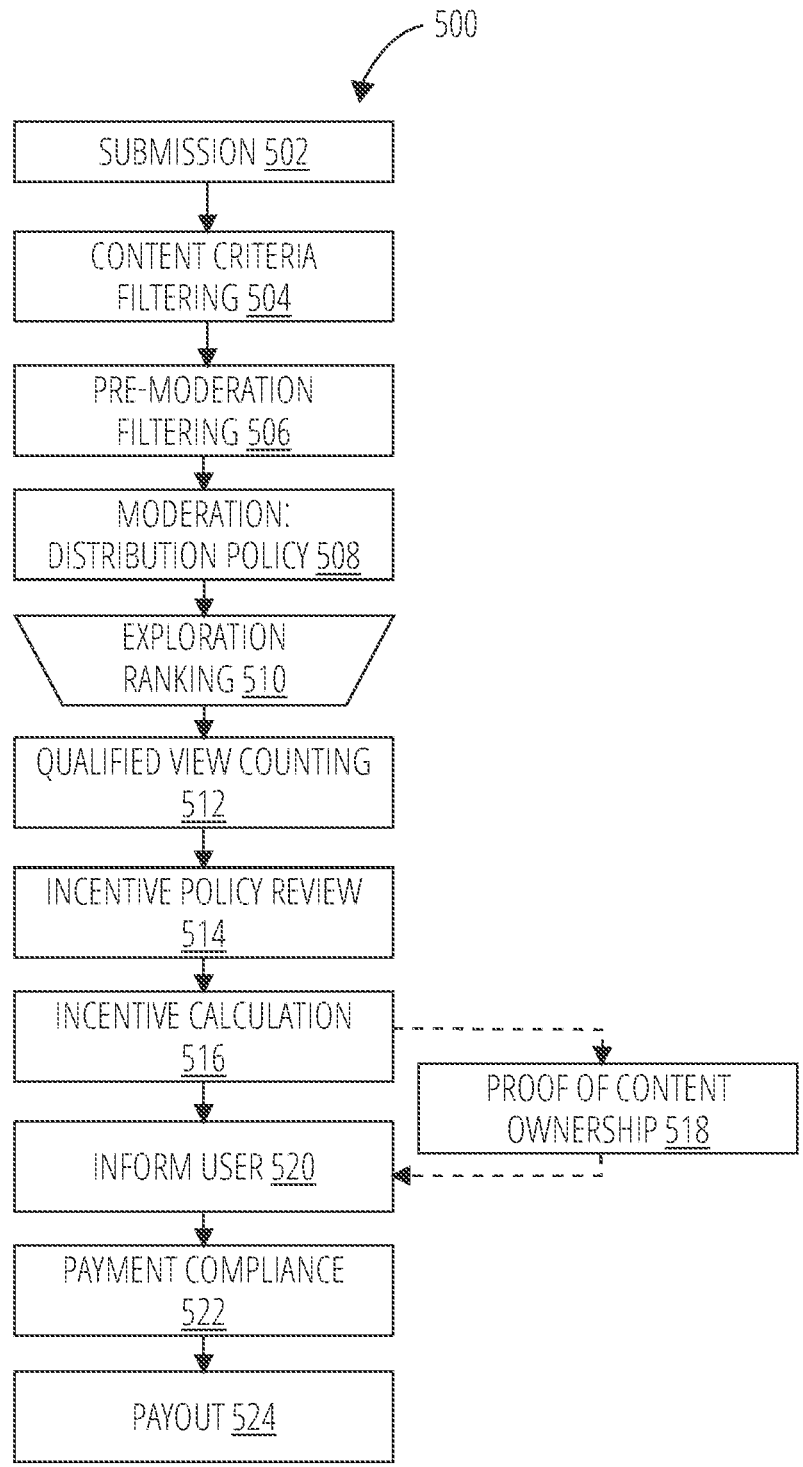
FIG. 5 is a flow diagram illustrating a process for providing a content-based incentive program in a messaging system, in accordance with some example embodiments.

FIG. 5 is a diagram illustrating a process 500 for providing a content-based incentive program in a messaging system, in accordance with some example embodiments. For explanatory purposes, the process 500 is primarily described herein with reference to the content feed and incentive system 214 of FIG. 2, and one or more messaging clients 104 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

As described herein, a submitting user associated with a messaging client 104 submits a media content item to a content feed implemented by the content feed and incentive system 214, for entry into an incentive program. In doing so, the submitting user may select an available incentive (e.g., user payout) for that media content item. In one or more embodiments, the content feed includes different incentives (e.g., payouts) for different content. For example, the content feed is organized into one or more sets of media content items, each of which has media content items meeting predefined content criteria, and each of which provides a respective incentive (e.g., user payout).

In one or more embodiments, the predefined content criteria corresponds to one or more of using a particular augmented reality content item (e.g., Lens), third-party app, geo-location and/or sound file (e.g., song) specified by an administrator associated with the content feed and incentive system 214. The content feed and incentive system 214 is configured to determine if the submitted media content item meets the content criteria requirements for the selected incentive (e.g., user payout), and if so, to update the respective set of media content items for that incentive to include the submitted media content item.

After the media content item has been added to the set of media content items, the content feed and incentive system 214 makes the media content items available (e.g., as selectable icons) within that set of media content items. The content feed and incentive system 214 determines viewer engagement with respect to the submitted media content item, for example, relative to the remaining media content items within the set of media content items. The content feed and incentive system 214 provides for user payout to the submitting user based at least in part on the determined viewer engagement.

For example, in a case where the media content item reaches a threshold number of qualified views (e.g., where a threshold number of viewing users select the icon to view the media content item), the content feed and incentive system 214 preliminarily identifies the submitting user as eligible for the respective incentive (e.g., a user payout). In addition, the content feed and incentive system 214 performs compliance with respect to content rights of the media content item, and compliance with respect to user payment requirements. If the appropriate requirements are met, further human review (e.g., by the administrator or an administrative body) of the media content item may be performed. Based on the human review, the content feed and incentive system 214 provides for user payout to the submitting user. The amount of user payout may be based at least in part on the number of qualified views for the media content item.

Thus, at block 502, the user at the messaging client 104 submits a media content item to the content feed and incentive system 214, and further selects to submit the entry for a particular incentive (e.g., user payout). As noted above, the content feed and incentive system 214 allows an administrator or administrative body to specify content criteria for submitting to a particular incentive, such that all media content items for that particular incentive meet the content criteria. For example, the administrator or administrative body may create an incentive in order to promote a particular augmented reality content item, third-party app, geo-location and/or sound file. The content feed and incentive system 214 may provide appropriate user interfaces for the administrator to specify such content criteria for a particular incentive.

Moreover, the incentive may be associated with an administrator-specified eligible time period. For example, the eligible time period may correspond to a 24 hour window starting at a preset time (e.g., starting at UTC-7). Each media content item within the set of media content items is subject to the eligible time period.

While the example of FIG. 5 is described with respect to a media content item submitted by a user, it should be understood that the content feed and incentive system 214 is not limited to media content items. For example, the content feed and incentive system 214 may be configured to provide incentives with respect to media content items, content collections (e.g., Stories), other forms of media content, and/or combinations thereof.

As discussed below with respect to FIGS. 7A-7C, the messaging client 104 provides user interfaces which allow the submitting user to select one or more incentives (e.g., user payouts) to apply for, and to select the media content item to submit for that incentive. In one or more embodiments, the user may select a previously-stored media content item for submitting with respect to the selected incentive. The media content item may be selected from a library. For example, the library may be associated with the user account of the user, and may include media content items (which includes image, video and/or annotations) and/or Stories that were previously generated and saved by the user (e.g., in the database 126).

In one or more embodiments, the previously-stored media content item may be tagged (e.g., via hashtag) to indicate, or otherwise have metadata indicating, types of content associated with the media content item. For example, the tags (e.g., hashtags, metadata) may indicate one or more of an augmented reality content item used to generate the media content item, a third-party app associated with generating the media content item (e.g., via a deep link from the third-party app to the messaging client 104), a geo-location of the client device 102 during generation of the media content item, and/or a sound file used in generating the media content item.

Alternatively or in addition to allowing previously-stored media content items, the content feed and incentive system 214 may allow the user to generate a new media content item to automatically qualify for the selected incentive (e.g., by meeting the corresponding the content criteria). In this regard, the content feed and incentive system 214 may automatically launch the device camera and surface appropriate interfaces to include the required content. The camera may correspond to a front-facing camera (e.g., for capturing image/video which depicts the user's face), or to a rear-facing camera (e.g., for capturing image/video of another object, scenery of the like), and the content feed and incentive system 214 is configured to select which camera (e.g., front or rear) is appropriate for the content criteria. The media content item may include the captured image/video captured in real-time, together with any annotations, overlays, augmented reality content and the like (e.g., per the augmentation system 208).

For example, in a case where the content criteria requires use of a particular augmented reality content item (e.g., Lens), the content feed and incentive system 214 is configured to cause the messaging client 104 to launch the appropriate device camera while automatically applying the augmented reality content item. The corresponding media content item generated from this interface may be tagged (e.g., automatically by the content feed and incentive system 214, or alternatively via user annotation) to indicate the augmented reality content item. In a case where the content criteria requires use of a particular sound (e.g., a sound file such as a song), the content feed and incentive system 214 is configured to cause the messaging client 104 to launch the appropriate device camera while automatically applying (e.g., playing) the sound. The corresponding media content item generated from this interface may be tagged (e.g., automatically by the content feed and incentive system 214, or alternatively via user annotation) to indicate the sound file.

Further, in a case where the content criteria requires use of a particular third-party app, the content feed and incentive system 214 is configured to cause the messaging client 104 to launch an app page for the third-party app (e.g., which may include a deep link back to the messaging client 104), or to launch the appropriate device camera while automatically applying the third-party app content. The corresponding media content item generated from this interface may be tagged (e.g., automatically by the content feed and incentive system 214, or alternatively via user annotation) to indicate the third-party app. Moreover, in a case where the content criteria requires use of a particular geo-location, the content feed and incentive system 214 is configured to cause the messaging client 104 to display a notification indicating that the incentive requires submission of a media content item taken from the specified location (e.g., based on a predefined geo-fenced area and/or with a location tag applied). The corresponding media content item generated from this interface may be tagged (e.g., automatically by the content feed and incentive system 214, or alternatively via user annotation) to indicate the geo-location.

In one or more embodiments, the messaging client 104, as part of submitting the media content item, prompts the user to agree to terms and conditions for the incentive program. For example, the terms and conditions are presented the first time that the user submits a media content item to the content feed and incentive system 214 (but not for subsequent submissions by the user).

At block 504, the content feed and incentive system 214 performs content criteria filtering with respect to the media content item submitted by the user and the incentive selected by the user at block 502. In other words, the content feed and incentive system 214 determines if the submitted media content item meets the content criteria for the selected incentive. In one or more embodiments, the content feed and incentive system 214 performs such content criteria filtering by checking if the media content item is tagged (e.g., via hashtag or metadata) to indicate the content (e.g., augmented reality content item, third-party app, geo-location and/or sound file) required for the selected incentive.

At block 506, the content feed and incentive system 214 performs pre-moderation filtering with respect to the media content item. In one or more embodiments, the pre-moderation filtering corresponds to automated filtering and tagging of the submitted media content item, thereby improving the efficiency of downstream systems and the consumption experience.

The pre-moderation filtering may implement or otherwise access one or more machine learning (ML) classifiers, to remove high-probability violating content (e.g., content which violates a content policy) in an automated manner. For example, a machine learning model may be trained with samples (e.g., images, audio, text and/or combinations thereof) corresponding to violating content, together with predefined types of sensitive/violating content. For example, violations of content policy may apply to content of the following types: sexually explicit material; harassment and bullying; threats, violence and harm; impersonation, deceptive practices and false information; illegal activity; and/or terrorism, hate groups, and hate speech. Following training of the machine learning model, the machine learning model may be configured to receive different media content items, and to output indications of whether the input corresponds to violating content, and/or the respective type(s) of violating content.

In addition, the pre-moderation filtering may provide for one or more of: removing low-quality images and/or low-quality video; rejecting high-probability spam; rejecting previously submitted content (e.g., via fingerprinting); tagging content with automated classifiers (e.g., for personalization as discussed below); and/or prioritizing the likely cleanest (e.g., high quality) media content items for viewing users.

At block 508, the content feed and incentive system 214 provides or otherwise facilitates human moderation of the media content item with respect to a predefined distribution policy. For example, the content feed and incentive system 214 prompts (e.g., via appropriate user interfaces or notifications) a human moderator to review the media content item for adherence to the distribution policy. The distribution policy may include requirements related to the privacy of user data. In one or more embodiments, the distribution policy includes requirements other than content rights (e.g., which is addressed below with respect to block 514) and/or monetization eligibility (e.g., which is addressed below with respect to block 522).

At block 510, the content feed and incentive system 214 performs exploration ranking with respect to the submitted media content item. In one or more embodiments, the exploration ranking corresponds with distributing the media content item via the content feed to viewing users, for potentially viewing by the viewing users.

With respect to distribution to viewing users, the content feed and incentive system 214 in example embodiments provides for the content feed to be personalized for each viewing user. For example, the content feed and incentive system 214 ranks submitted media content items based on different factors. Examples of such factors include, but are not limited to: history of the viewing user's engagement with prior media content; user preferences for types of content as specified by the user (e.g., in association with a user profile); and/or content included within media content items (e.g., based on respective tagged content for media content items).

In one or more embodiments, additional factors for personalization relate to the age-gating. For example, the content feed may be configured to serve content categories to appropriate age groups, and may facilitate user-controlled content gating. The content feed and incentive system 214 may provide for age-gating on a content-level (indicating some content as not appropriate for some age groups), and/or on a creator-level (showing similarly-aged creators to similarly-aged viewers/cohorts).

In one or more embodiments, the content feed of the content feed and incentive system 214 is one of multiple feeds made available by a feed interface of the messaging system 100. For example, from the perspective of messaging client 104 associated with a viewing user, the feed interface may provide a friends list with icons representing friends with available content collections (e.g., Stories). In another example, the feed interface may provide a subscription list with icons representing publishers (e.g., merchants, social media influencers, businesses, advertisers, and the like) with available content collections.

As described herein, the feed interface further provides the content feed (e.g., of the content feed and incentive system 214) with icons representing the available media content items and/or content collections (e.g., Stories) submitted for entry into the incentive program. In one or more embodiments, the content feed may include media content items and/or content collections (e.g., Stories) that are in addition to those submitted for entry into the incentive program. For example, the content feed and incentive system 214 may identify media content items and/or Stories, as submitted by respective publishers who are not necessarily participating in the incentive program, for including in the content feed. These additional media content items and/or Stories may be selected based on the above-noted factors for ranking media content. In this manner, the content feed and incentive system 214 may provide for increased personalization and variety for viewing user(s).

With respect to viewing, the media content item may be viewed by user selection of its corresponding icon within the content feed, for example, as discussed with respect to FIGS. 7A-7C below. In one or more embodiments, the media content item is initially made available and/or prioritized for display (e.g., via placement of the icon) to a small predefined set of viewing user(s) (e.g., based on the above-mentioned personalization factors). The placement of the icon relative to other icons (corresponding to other submitted media content items) may be based on ranking related to the above-mentioned personalization factors. The content feed and incentive system 214 is configured to detect when the respective icon is selected by a viewing user, thereby indicating that the viewing user selected to view the media content item. Such viewing may be used to determine subsequent distribution of the media content item. For example, the content feed and incentive system 214 is configured to increase distribution of the media content item (e.g., to distribute the media content item to additional viewing users) in response to detecting a threshold number (e.g., a first threshold) of initial views. As the viewing count for the media content item increases, the content feed and incentive system 214 may continually increase distribution of the media content item.

At block 512, the content feed and incentive system 214 provides for qualified view counting of the media content item. In one or more embodiments, the content feed and incentive system 214 determines whether the submitted media content item meets a threshold number of qualified views (e.g., a second threshold) during the eligible period, in order to be eligible for an incentive. In one or more embodiments, a qualified view count corresponds with the count of unique viewing users in a given time period (e.g., a 24 hour time period starting at a preset time) who viewed the media content item for greater than 0 seconds. For example, viewing the media content item for greater than 0 seconds may indicate that the viewing user selected the icon of the media content item from within the feed interface, and that the media content item was rendered on the respective messaging client 104 of the viewing user. While this example is described with respect to viewing, the content feed and incentive system 214 may, alternatively or in addition, adjust distribution and qualified counting based on other user feedback, such as but not limited to the user endorsing (e.g., clicking a "like" button), forwarding and/or saving the media content item.

At block 514, the content feed and incentive system 214 facilitates human moderation of the media content item with respect to a predefined incentive policy. For example, the content feed and incentive system 214 prompts a human moderator (e.g., the administrator or administrative body) to review the media content item for adherence to the incentive policy. The incentive policy may include requirements related to content rights. In one or more embodiments, the incentive policy may include requirements regarding the ownership rights (e.g., copyright and/or other intellectual property rights) to the content included within the media content item.

In one or more embodiments, human moderation of the media content item may correspond with the human moderator selecting the media content item from among multiple candidate media content items for a particular incentive. Each of the multiple candidate media content items (e.g., from the set of media content items for a given incentive) may have reached the above-noted threshold number of qualified views per block 512. The human moderator may review a subset of the candidate media content items reaching the threshold (e.g., the top fifty, ranked by number of views), and select a single media content item from the subset for user payout. The content feed and incentive system 214 may provide appropriate user interfaces to present the candidate media content items to the moderator, and to select the media content item for user payout.

In association with calculating an incentive discussed below (see block 516), the content feed and incentive system 214 at block 518 may facilitate in prompting the submitting user to provide proof of ownership with respect to the media content item. For example, in a case where ownership of the media content item is unclear (e.g., during review at block 514), the human moderator in conjunction with the content feed and incentive system 214 may require the submitting user to provide additional information to demonstrate that the content belongs to the user (e.g., was created via the user account of the user).

Thus, the content feed and incentive system 214 performs content criteria filtering (block 504), pre-moderation filtering (block 506), compliance with the distribution policy (block 508), the qualified view counting (block 512), and compliance with the incentive policy (block 514). As noted above, the order of such operations are for example purposes, and the content feed and incentive system 214 may perform such operations in a different order. By virtue of performing the operations corresponding to blocks 504-514, it is possible for the content feed and incentive system 214 to assign the submitted media content item into one of three categories. The three categories include: rejected, eligible for distribution only and eligible for distribution and incentive.

In one or more embodiments, the content feed and incentive system 214 provides a user interface, within the messaging client 104, for accessing status information with respect to the submission. For example, the status information indicates whether the submitted media content item is pending review, has been accepted into the content feed, has earned a payout, and the like. Moreover, the interface may indicate which of the above-mentioned three categories has been assigned to the media content item. In this manner, the submitting user may check on the status of his/her submission via the messaging client 104.

Regarding block 516, the content feed and incentive system 214 provides for calculating the incentive amount(s) (e.g., user payouts) for the media content item. In one or more embodiments, eligible media content items that are approved via the incentive policy review (per block 514) are included in the incentive calculation. The media content item may be allocated a share of a fixed incentive pool based the ratio of its qualified view count (per block 512) to a total number of qualified views for all participating media content items.

In this regard, the incentive program implemented by the content feed and incentive system 214 may follow a specific program structure, for example, with respect to the size of the incentive pool and how the incentive pool is divided for user payouts to different submitting users (e.g., on a per-incentive basis, with each incentive being associated with a respective set of media content items as described herein). By way of non-limiting example, the incentive program may include the following requirements: ensure a daily earnings exceeding a predefined amount; have a least one submitting user earn payout perceived to be large (e.g., a predefined amount that is perceived as "headline-grabbing"); have a minimum number of users (e.g., at least 100 users) who become eligible for the payout for each eligible period (e.g., on a daily basis); and increase broad, global participation from users for the content feed (e.g., and not just brands and established influencers).

With respect to financial structure and allocation, the incentive program is structured as follows according to example embodiments. A fixed incentive pool exceeding a predefined amount is allocated on a periodic basis (e.g., a daily basis). The fixed incentive pool may be allocated into a discretionary bonus pool and a direct allocation pool. The allocations between the two pools may be adjusted. Moreover, the fixed incentive pool may be fully replenished for every new period (e.g., daily).

Regarding the direct allocation pool, eligible earnings may be calculated as follows:

User's Eligible Earnings=[Daily Pool]*[User's Portion of Cohort Qualified Views]*[Country Restriction Adjustment].

By way of example, the Daily Pool is split into two buckets as noted above. The User's Portion of Cohort Qualified Views corresponds to the eligible submission's total qualified viewing count]/[Total qualified viewing count from the same-day cohort]).

In one or more embodiments, a "cohort" refers to the group of submissions which collectively share a single pool. This may be constrained based on the following requirements: timestamps—a submission's qualified view count is greater than 0 within the cohort day (e.g., timed 12:00 am PT to 11:59 pm PT of the same day); and minimum payouts being no less than a predefined amount (e.g., no less than $1,000).

In addition, the Country Restriction Adjustment corresponds to [Global Content Feed Viewers]/[Submission's Reachable Content Feed Viewers]. For example, this adjustment facilitates in mitigating impact for distribution restrictions in certain countries.

Moreover, with respect to the direct allocation pool, the content feed and incentive system 214 may implement a minimum pool contribution. For example, an eligible submission may only be included in the direct allocation pool if it contributes greater than a predefined percentage of the pool.

In one or more embodiments, the daily pool as described herein is applied on a total basis, such that the incentives share a predefined portion of the daily pool. Alternatively or in addition, each incentive is assigned a respective daily pool amount, for example, corresponding to the respective user payout for that incentive. Moreover, while the above example describes a daily pool amount, the content feed and incentive system 214 is not limited to such, where each incentive is assigned a respective and different time period and user payout.

As noted above, the qualified views corresponds to the count of unique users in a given time period with greater than 0 seconds rendered view of a media content item sourced from the content feed. In addition, the eligible submission's total qualified viewing count corresponds to the total qualified views for an individual submission aggregated over the time period (e.g., the 24 hour window starting from the preset time).

On the other hand, in one or more embodiments, the discretionary bonus pool is allocated as follows: the top performer of a cohort (e.g., as deemed by highest quality value count) is granted an additional preset amount (e.g., a bonus); the second highest performer is granted another preset amount; and a third highest performer is granted yet another present amount. It is noted that these amounts, and the bonus pool, may be adjustable (e.g., by an administrator overseeing the incentive program).

Thus, the content feed and incentive system 214 at block 516 calculates the incentive amount for the submitting user. At block 520, the content feed and incentive system 214 notifies the submitting user of the incentive (e.g., user payout), following proof of ownership by the submitting (block 518) user if applicable. In one or more embodiments, the notification is provided to the submitting user via a message within the messaging application (e.g., the messaging client 104 of the user).

At block 522, the content feed and incentive system 214 performs or otherwise facilitates payment compliance with respect to the user payout for the user. In one or more implementations, the content feed and incentive system 214 provides for (e.g., via appropriate user interfaces) collecting personal and financial information required to make incentive program payouts.

In addition, the content feed and incentive system 214 may run required compliance checks for payment. For example, the content feed and incentive system 214 may implement eligibility requirements for payouts. In one or more embodiments, the minimum eligibility requirements to participate in the incentive program include: being at least 16 years old subject to company policies and guidelines for payout; being at least 18 years old for direct payout; parent(s) receiving payment for eligible participant under 18 years old; and/or the user must being from a country deemed allowable for the incentive program.

The content feed and incentive system 214 may also implement a time period for claiming payment. In other words, if a user is notified of a payout but does not claim payment within the time period (e.g., X days), that user may no longer be eligible to receive that payment. Moreover, as noted above, total earnings from a submission must exceed a minimum value (e.g., $1,000).

At block 524, the content feed and incentive system 214 provides for user payout with respect to the submitted media content item. As discussed further below with respect to FIG. 6, the content feed and incentive system 214 may work in conjunction with a third-party payment system to provide payout to the user.

Thus, FIG. 5 describes user payout(s) during an eligible time period (e.g., 24 hours) for a cohort. It should be understood that the payout(s) may be repeated for subsequent eligible time periods with different cohorts. For example, the incentive program implemented by the content feed and incentive system 214 may be scheduled to span a month, with user payout(s) being provided on a daily basis. In one or more embodiments, a particular user who receives user payout for a submission on day 1 of the month would still be eligible for payout on subsequent days of the month, using the same media content item for each daily submission. The content feed and incentive system 214 is configured to evaluate the submission on a daily basis relative to other submissions for a given day.

Thus, the content feed and incentive system 214 promotes and encourages user submissions for the content feed. For example, such promotion may be effective in association with launching the content feed as a new feature of the messaging system 100. The incentive program implemented by the content feed and incentive system 214 may: drive content submission, consumption, and engagement to become a more regular behavior for users of the messaging application; improve personalization for each user's experience through an expanded pool of content with respect to the content feed; increase the likelihood of finding a proverbial "one in a million" that will be entertaining to a large number of people on and off of the messaging application; and/or put the content feed on the path to becoming part of a reliable and compelling creator monetization strategy.

Further, the content feed and incentive system 214 as described herein provides for a user to submit a media content item for entry into an incentive program offered by a content feed. The content feed includes different incentives (e.g., payouts) for different types of content, with each incentive having predefined content criteria associated therewith. The submitting user selects a particular incentive when submitting the media content item for entry into the incentive program. By virtue of providing a content-based incentive program within a messaging system in this manner, it is possible to facilitate coordinating incentives, selecting users for payout for respective incentives, and determining payout amounts for respective incentives. Without providing for such a content-based incentive program, additional human effort would be required to coordinate incentives, select users for payout and determine payout amounts, and manually enter incentive information within the messaging system and/or additional systems (e.g., third-party incentive program systems, payout systems, and the like). As such, the messaging system 100 saves time for system users (e.g., administrators), reduces computational resources/processing power associated with coordinating incentives, selecting users for payout and determining payout amounts. Moreover, the content-based incentive program as described herein may be more engaging for users of the messaging system 100.

Figure 6:
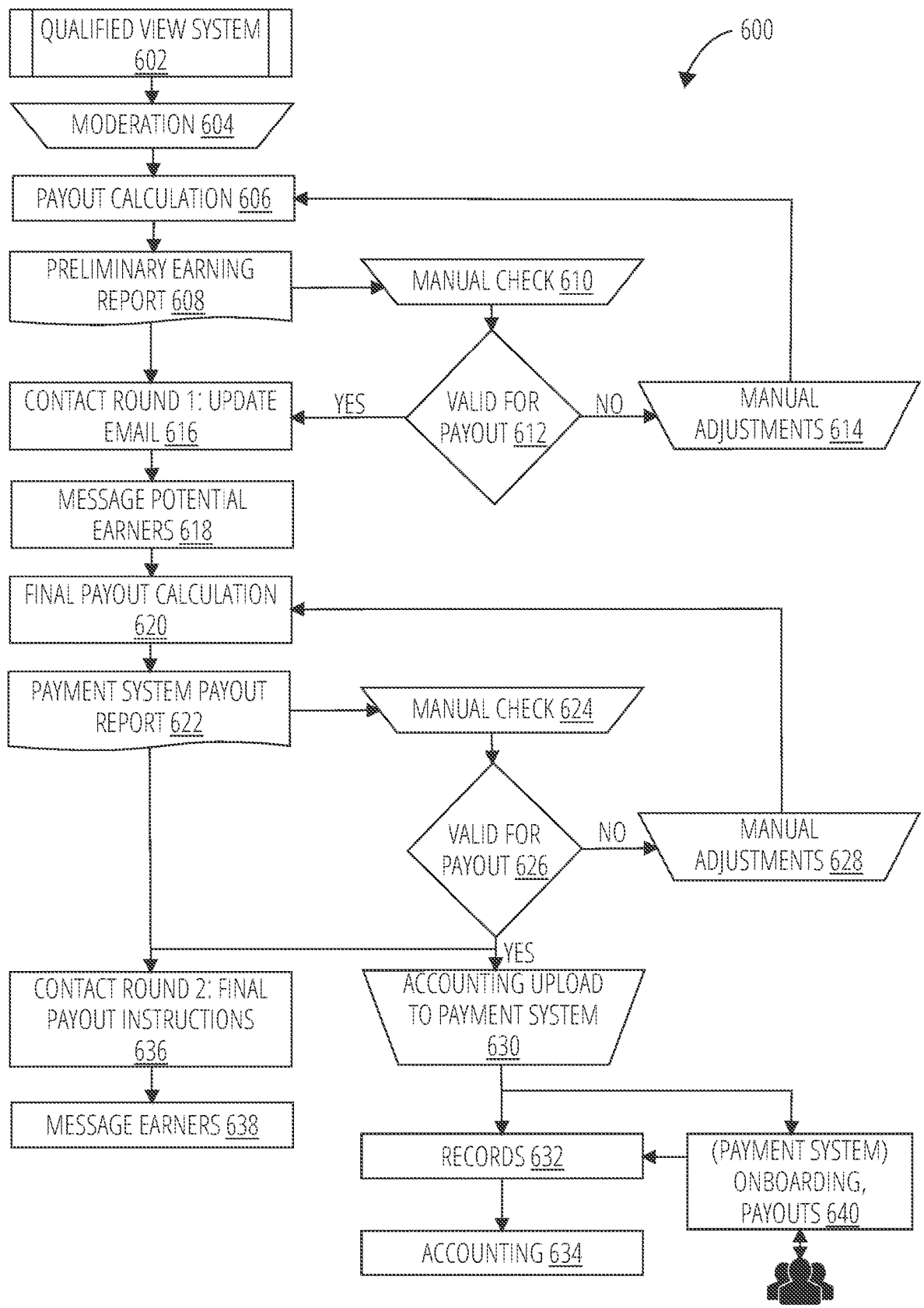
FIG. 6 is a diagram illustrating a process for providing a content-based incentive program in a messaging system, in accordance with some example embodiments.

FIG. 6 is a diagram illustrating a process 600 for providing a content-based incentive program in a messaging system, in accordance with some example embodiments. For explanatory purposes, the process 600 is primarily described herein with reference to the content feed and incentive system 214 of FIG. 2, and one or more messaging clients 104 of FIG. 1. However, one or more blocks (or operations) of the process 600 may be performed by one or more other components, and/or by other suitable devices. Further for explanatory purposes, the blocks (or operations) of the process 600 are described herein as occurring in serial, or linearly. However, multiple blocks (or operations) of the process 600 may occur in parallel or concurrently. In addition, the blocks (or operations) of the process 600 need not be performed in the order shown and/or one or more blocks (or operations) of the process 600 need not be performed and/or can be replaced by other operations. The process 600 may be terminated when its operations are completed. In addition, the process 600 may correspond to a method, a procedure, an algorithm, etc.

In one or more embodiments, the process 600 relates to obtaining user contact information, calculating user payout, contacting the submitting user, onboarding, and effecting user payout (e.g., via a third-party payment system). In this regard, the process 600 expands on a subset of the operations described above with respect to FIG. 5.

As described below, the incentive program implemented by the content feed and incentive system 214 may implement a schedule which refers to different revenue days. For example, the revenue days may be used to schedule various notifications and/or user payouts.

The qualified view system referenced by block 602 corresponds with the qualified view counting discussed above with respect to block 512 in FIG. 5. As noted, above, the content feed and incentive system 214 determines whether the submitted media content item meets a threshold number of qualified views during the eligible period, in order to be eligible for an incentive. Thus, in one or more embodiments, the qualified view system referenced by block 602 corresponds to a subsystem of the content feed and incentive system 214.

Further, the moderation referenced by block 604 corresponds with above-described human moderation in FIG. 5. For example, the moderation of block 604 corresponds to human moderation with respect to one or more of the distribution policy of block 508 or to the incentive policy of block 514.

Moreover, the payout calculation referenced by block 606 corresponds with the incentive calculation discussed above with respect to block 516 of FIG. 5. As noted above, the content feed and incentive system 214 calculates the incentive (e.g., user payout) for each of a minimum number of submitting users (e.g., a minimum of 100 users).

Block 608 corresponds with the content feed and incentive system 214 generating a preliminary earning report. Thus, following the conclusion of a cohort's eligibility period, and after validation and moderation checks are complete (excluding KYC), the preliminary report can be generated (e.g., on revenue day 1). The preliminary report may be generated to include the following fields: username, user ID, user age, user country (for legal/marketing validation), cohort ID (a unique ID for the cohort of pooled users that split the incentive pool), cohort start date (e.g., first date of content run, so that the cohort can be locked), submission ID (unique ID of the user's content submission), user allocated earnings (earned payout from the incentive pool), user qualified views (total count of qualified views for that users content submission in that cohort), bonus earnings (extra earnings applied to top performer), first name, last name, email, unique access token (hashed user ID to provide to the third-party payment system) and/or contact status (status if this was sent for email contact, or payment).

The content feed and incentive system 214 facilitates manual review of the preliminary earning report by a reviewer. In one or more embodiments, one or more of the above-listed fields (e.g., the username, the unique access token, and the contact status) are not provided to the reviewer. The reviewer is required to sign off on earners (e.g., submitting users determined to have earned an incentive) and payout amounts prior to contacting the earner. The discretionary bonus amounts can be validated by the reviewer. In one or more embodiments, the report is manually validated to check that: the total cohort payout corresponds to the expected amount (e.g., $1.001 M); allocated earnings total the expected amount (e.g., $601 k) and are directly proportional to the qualified view total; and the discretionary bonus (e.g., $400 k) is applied to appropriately (e.g., the top earner of that day, or split among the top 3 earners). In one or more embodiments, the reviewer performs the manual check (block 610), for example on revenue day 1. The reviewer can make manual adjustments (block 614) based on whether the report indicates that the payout is valid (decision block 612).

At block 616, the content feed and incentive system 214 provides for updating/confirming the email address for each potential earner. At block 618, the content feed and incentive system 214 sends message(s) within the messaging application to each potential earner, requesting them to update/confirm their email addresses. In one or more embodiments, the message(s) are sent according to a predefined schedule (e.g., revenue day 1, revenue day 4, revenue day 7) until the potential earner responds.

The message content may inform the earner user that they earned a payout, but that they must provide a valid email address to claim the payout. In one or more embodiments, the content feed and incentive system 214 may lock earners from updating their email/contact information (e.g., at revenue day 8). In other words, earners without a valid email address may forfeit their eligibility for their payout at revenue day 8. In addition, the content feed and incentive system 214 may provide a manual contact flow for any earner who does not meet the timeline. As such, it is possible for a subset of earners who were initially eligible for the user payout to lose their eligibility status.

At block 620, the content feed and incentive system 214 facilitates determining the final payout calculation. Block 622 corresponds with the content feed and incentive system 214 generating a payout report associated with the third-party payment system. For example, the content feed and incentive system 214 (e.g., on revenue day 8) provides for generating and validating a form for uploading to the third-party payment system. The final payout list is generated for uploading, inclusive of emails (e.g., associated with the earners and/or the third-party payment system).

The report from block 622 may be provided to a human reviewer for manual review at block 624. For example, the reviewer validates that the total payout matches the cohort's earner report, and that each earner has the appropriate amount. In one or more embodiments, earners with no email are not necessarily dropped from the report, but presented without contact information (e.g., email address). After positive confirmation from a manual reviewer per block 624 and decision block 626 (with manual adjustments via block 628 if applicable), data is uploaded to the third-party payment system per block 630. For example, the upload may be performed by an appropriate administrator (e.g., accounting representative). At block 632, the payout report may also be provided (e.g., replicated) to a records system, which may accessed by accounting (e.g., block 634). In one or more implementations, such recording may correspond with FRS compiling a transaction file for accounting purposes.

With respect to block 636, users earning an incentive payout are provided with a notification that they have provisionally earned a payout. For example, at block 638, the content feed and incentive system 214 sends a one-time notification within the messaging application to the users, indicating that they will be contacted by the third-party contact system via email and providing a unique access token for the payout. In this regard, the notification is presented after the users have been validated to be an earner and have entered contact information.

Thus, the users (e.g., on revenue day 8) are directed to the third-party payment system per block 640, and prompted to onboard to the third-party payment system for payout. As noted above with respect to block 522 of FIG. 5, the content feed and incentive system 214 (e.g., in conjunction with the third-party payment system) collects personal and financial information required to make incentive program payouts, and runs required compliance checks. When payment and compliance checks are complete, the user is informed that the payout has been approved and that payment has been sent (e.g., via a check). In one or more implementations, the third-party payment system provides a report to the content feed and incentive system 214 confirming the payout.

Figure 7A:
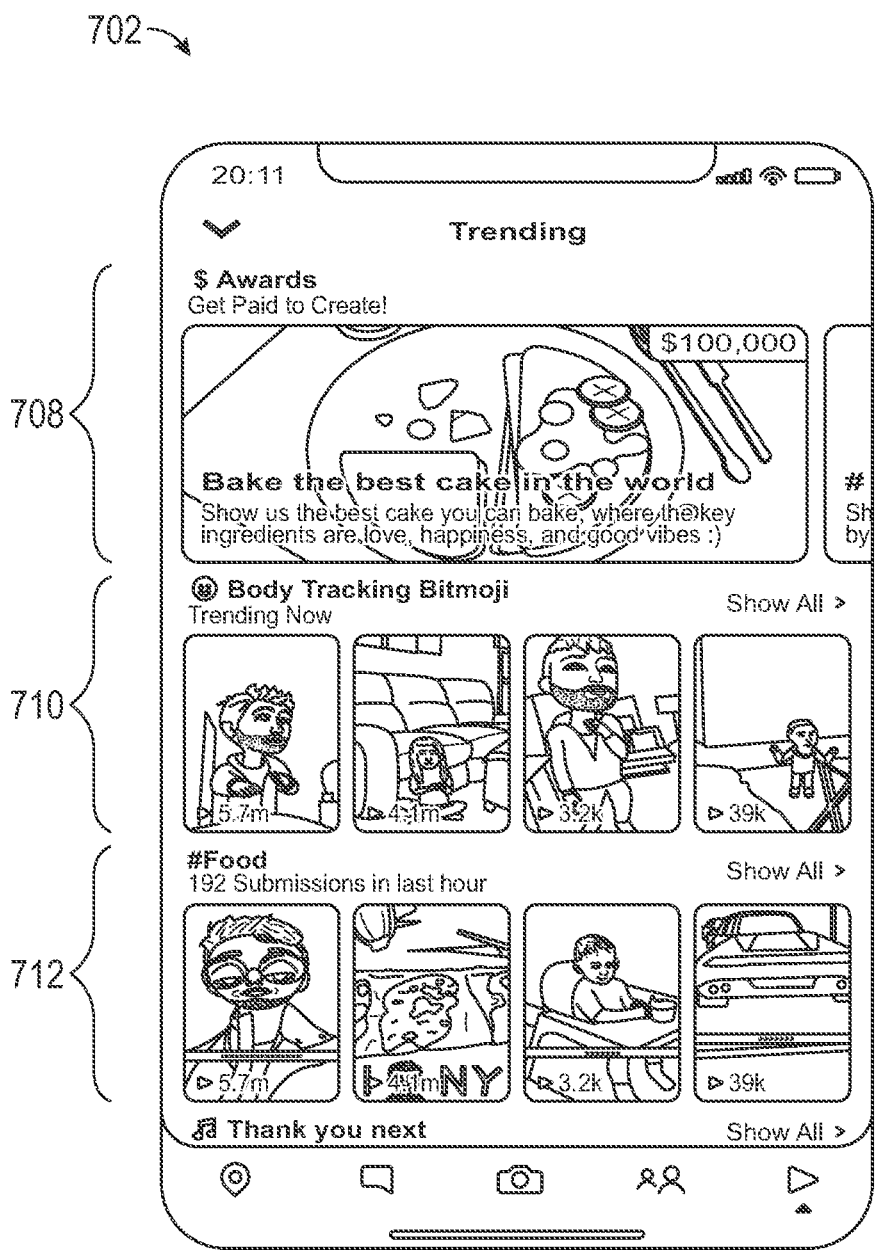
FIGS. 7A-7C illustrate example user interfaces for submitting a media content item to a particular incentive offered within a content feed, in accordance with some example embodiments.
Figure 7B:
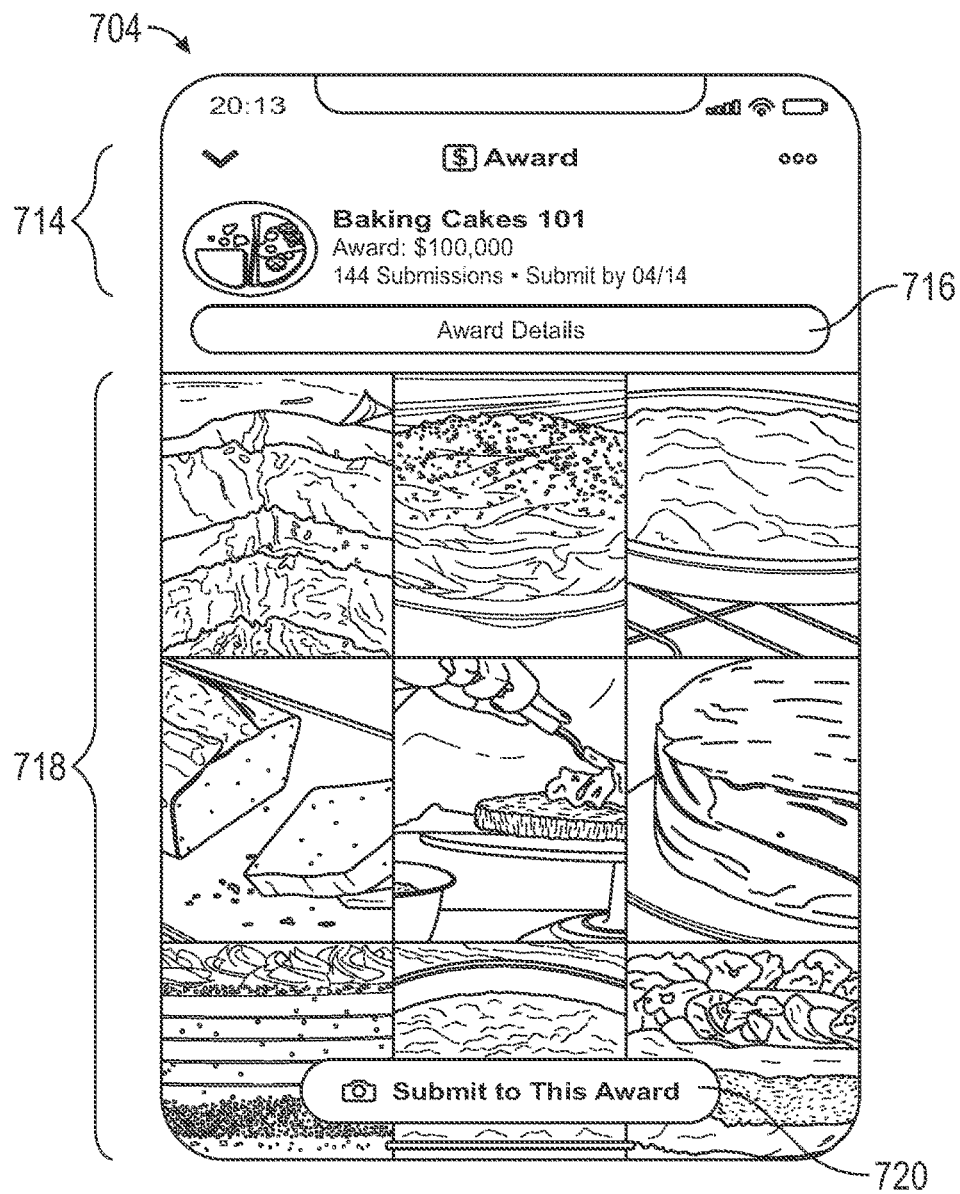
Figure 7C:
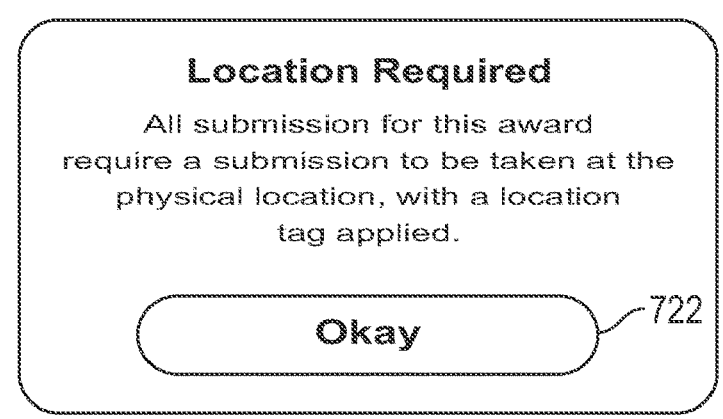

FIGS. 7A-7C illustrate example user interfaces 702-706 for submitting a media content item to a particular incentive offered within a content feed, in accordance with some example embodiments. In the example of FIG. 7A, the user interface 702 corresponds to a trending page associated with a content feed provided by the content feed and incentive system 214. The user interface 702 includes separate sections, including an awards section 708, and sections 710-712.

The awards section 708 corresponds to the various incentives discussed above with respect to FIGS. 5-6. As noted, each incentive is associated with respective content criteria and a respective user payout. Users can submit to (e.g., enter for a chance to win) a given incentive, where the submissions (e.g., media content items) are grouped and available for viewing. In one or more embodiments, the awards section 708 is configured to receive touch input (e.g., a right-swipe gesture) to scroll through available incentives depicted as respective cells within the awards section 708. Each cell includes a representative thumbnail, for example, corresponding to a highest-ranked submission from the set of media content items submitted for the incentive. For example, the highest-ranked submission is based on the ranking discussed above with respect to FIGS. 5-6. Each cell is user-selectable to navigate from the user interface 702 to the user interface 704, as discussed below with respect to FIG. 7B.

In the example of FIG. 7A, the user interface 702 further includes sections 710-712. Each of the sections 710-712 may include content, provided by the content feed and incentive system 214, which may not necessarily be submitted for incentive purposes as described herein. For example, the sections 710-712 may organize media content items based on topics (e.g., hashtags) and/or metadata. In one or more embodiments, each of the sections 710-712 is configured to receive touch input (e.g., a right-swipe gesture) to scroll through media content items, depicted as cells, for that section (e.g., topic, metadata). Each cell includes a representative thumbnail image corresponding to the media content item. Each cell is user-selectable to display the media content item in a full-screen view mode.

The example of FIG. 7B illustrates a user interface 704 which is surfaced in response to user selection of a cell within the awards section 708 of FIG. 7A. The user interface 704 includes a header 714, a details button 716, media content item entries 718 and a submit entry button 720.

The header 714 includes information about the particular incentive associated with the user-selected cell. For example, the header indicates the title of the incentive (e.g., Baking cakes), the incentive/award amount (e.g., $100,000), and award details including amount of entries (e.g., 144 entries) and submission deadline (e.g., submit by April 2014).

The details button 716 is a user-selectable button for displaying information (e.g., as a separate card or page) for the particular incentive. The information may include the same information provided in the header. In addition, the information in the separate card or page for the user interface 706 may provide general rules for submitting a media content item entry and/or a breakdown of the incentive award amount (e.g., for first, second and third-place finishers). For example, the breakdown of the incentive award amount may be calculated as discussed above with respect to FIGS. 5-6.

The user interface 704 further includes a submit entry button 720, which is user-selectable for the use to submit an entry (e.g., media content item) to the particular incentive. As noted above, the media content item may be a previously-stored media content item (e.g., in a library associated with the user), or may be generated in real-time by activating the device camera and automatically surface appropriate interfaces to meet the content criteria for the incentive. Thus, user-selection of the submit entry button 720 causes the content feed and incentive system 214 to surface interfaces for the user to select a previously-stored media content item and/or to generate a new media content item for submission with respect to the incentive.

In a case where the content criteria includes a geolocation requirement, the content feed and incentive system 214 may provide a notification corresponding to the user interface 706 of FIG. 7C. As shown in the example of FIG. 7C, the user interface 706 indicates the requirement that submissions for the particular incentive be generated at a predefined location, with a location tag being applied to the submitted media content item. In response to user selection of button 722, the content feed and incentive system 214 causes the user interface 706 (e.g., notification) to close.

Figure 8:
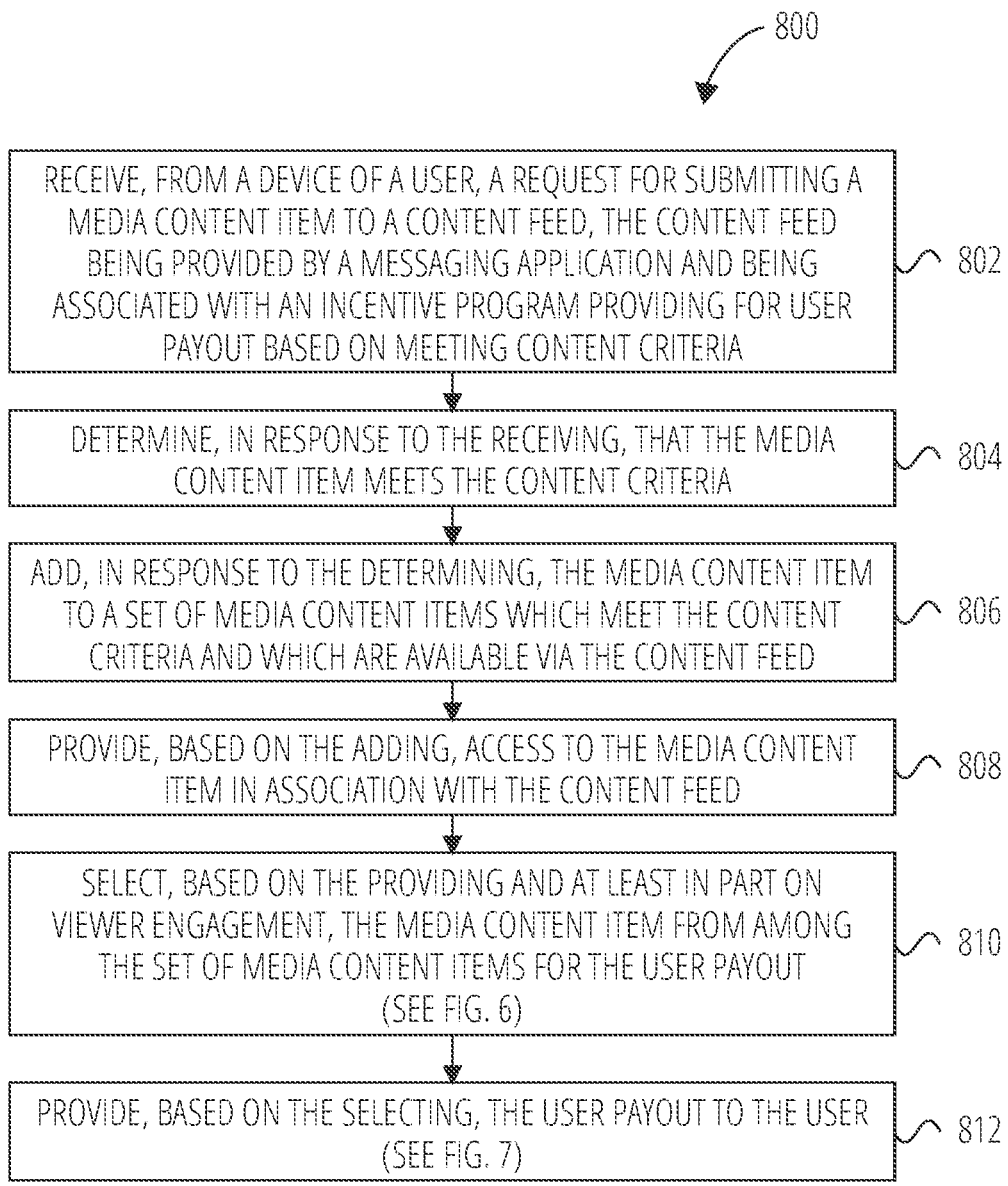
FIG. 8 is a flowchart illustrating a process for providing a content-based incentive program in a messaging system, in accordance with some example embodiments.

FIG. 8 is a flowchart illustrating a process 800 for providing a content-based incentive program in a messaging system, in accordance with some example embodiments. For explanatory purposes, the process 800 is primarily described herein with reference to the content feed and incentive system 214 of FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The content feed and incentive system 214 receives, from a device (e.g., the messaging client 104 running on the client device 102) of a user, a request for submitting a media content item to a content feed (block 802). The content feed is provided by a messaging application (e.g., the messaging server system 108) and is associated with an incentive program providing for user payout based on meeting content criteria.

The content feed and incentive system 214 may receive, prior to receiving the request, indication of the content criteria as specified by an administrator associated with the messaging application. Meeting the content criteria may correspond to one or more of: the media content item including predefined augmented reality content specified by the administrator; the media content item including predefined sound content specified by the administrator; the media content item including predefined third-party app content specified by the administrator; and/or the media content item including predefined location metadata specified by the administrator.

In addition, the content feed and incentive system 214 may set an expiration date for submission of additional media content items to the set of media content items. The expiration date may be specified by the administrator.

The content feed and incentive system 214 determines, in response to the receiving, that the media content item meets the content criteria (block 804). The content feed and incentive system 214 adds, in response to the determining, the media content item to a set of media content items which meet the content criteria and which are available via the content feed (block 806).

The set of media content items may be included within a plurality of sets of media content items, each set of media content items being associated with respective content criteria. Each set of media content items may be assigned a respective user payout. The content feed and incentive system 214 may provide display of an interface element in which each set of media content items is represented by a respective user-selectable card corresponding to that set of media content items.

The content feed and incentive system 214 may receive indication of a user selection of the user-selectable card corresponding to the set of media content items from among the plurality of sets of media content items. The content feed and incentive system 214 may provide display of an awards page for the set of media content items, the awards page depicting a ranked list of user-selectable cells, each user-selectable cell corresponding to a respective media content item within the set of media content items.

The content feed and incentive system 214 provides, based on the adding at block 806, access to the media content item in association with the content feed (block 808). The content feed and incentive system 214 selects, based on the providing and at least in part on viewer engagement, the media content item from among the set of media content items for the user payout (block 810). The selecting may be based at least in part on human review of the set of media content items, the human review being associated with the administrator. The content feed and incentive system 214 provides, based on the selecting, the user payout to the user (block 812).

Figure 9:
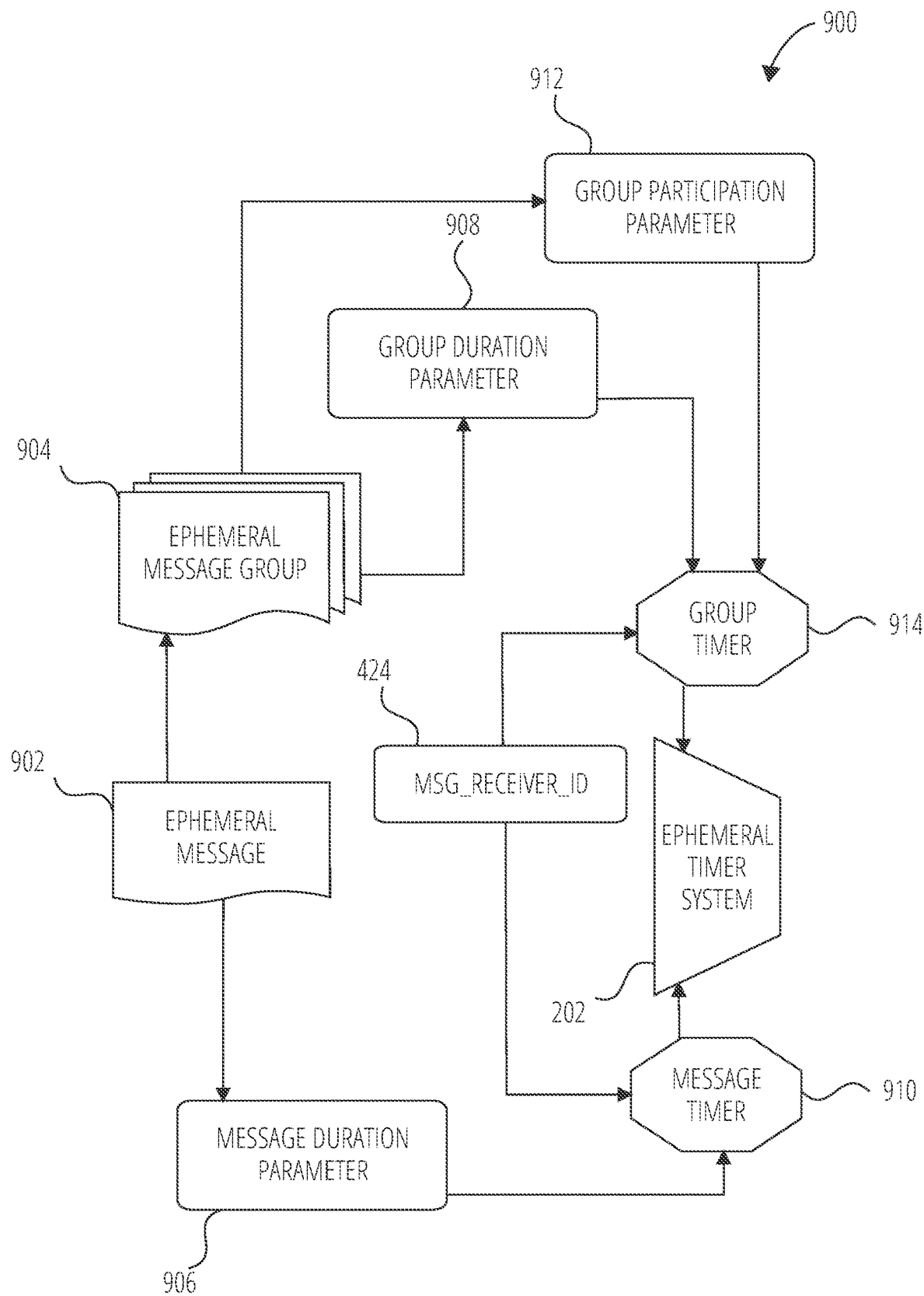
FIG. 9 is a flowchart for an access-limiting process, in accordance with some examples.

FIG. 9 is a schematic diagram illustrating an access-limiting process s 900, in terms of which access to content (e.g., an ephemeral message 902, and associated multimedia payload of data) or a content collection (e.g., an ephemeral message group 904) may be time-limited (e.g., made ephemeral).

An ephemeral message 902 is shown to be associated with a message duration parameter 906, the value of which determines an amount of time that the ephemeral message 902 will be displayed to a receiving user of the ephemeral message 902 by the messaging client 104. In one example, an ephemeral message 902 is viewable by a receiving user for up to a maximum of 10 seconds, depending on the amount of time that the sending user specifies using the message duration parameter 906.

The message duration parameter 906 and the message receiver identifier 424 are shown to be inputs to a message timer 910, which is responsible for determining the amount of time that the ephemeral message 902 is shown to a particular receiving user identified by the message receiver identifier 424. In particular, the ephemeral message 902 will only be shown to the relevant receiving user for a time period determined by the value of the message duration parameter 906. The message timer 910 is shown to provide output to a more generalized ephemeral timer system 202, which is responsible for the overall timing of display of content (e.g., an ephemeral message 902) to a receiving user.

1. The ephemeral message 902 is shown in FIG. 9 to be included within an ephemeral message group 904 (e.g., a collection of messages in a personal story, or an event story). The ephemeral message group 904 has an associated group duration parameter 908, a value of which determines a time duration for which the ephemeral message group 904 is presented and accessible to users of the messaging system 100. The group duration parameter 908, for example, may be the duration of a music concert, where the ephemeral message group 904 is a collection of content pertaining to that concert. Alternatively, a user (either the owning user or a curator user) may specify the value for the group duration parameter 908 when performing the setup and creation of the ephemeral message group 904.

Additionally, each ephemeral message 902 within the ephemeral message group 904 has an associated group participation parameter 912, a value of which determines the duration of time for which the ephemeral message 902 will be accessible within the context of the ephemeral message group 904. Accordingly, a particular ephemeral message group 904 may "expire" and become inaccessible within the context of the ephemeral message group 904, prior to the ephemeral message group 904 itself expiring in terms of the group duration parameter 908. The group duration parameter 908, group participation parameter 912, and message receiver identifier 424 each provide input to a group timer 914, which operationally determines, firstly, whether a particular ephemeral message 902 of the ephemeral message group 904 will be displayed to a particular receiving user and, if so, for how long. Note that the ephemeral message group 904 is also aware of the identity of the particular receiving user as a result of the message receiver identifier 424.

Accordingly, the group timer 914 operationally controls the overall lifespan of an associated ephemeral message group 904, as well as an individual ephemeral message 902 included in the ephemeral message group 904. In one example, each and every ephemeral message 902 within the ephemeral message group 904 remains viewable and accessible for a time period specified by the group duration parameter 908. In a further example, a certain ephemeral message 902 may expire, within the context of ephemeral message group 904, based on a group participation parameter 912. Note that a message duration parameter 906 may still determine the duration of time for which a particular ephemeral message 902 is displayed to a receiving user, even within the context of the ephemeral message group 904. Accordingly, the message duration parameter 906 determines the duration of time that a particular ephemeral message 902 is displayed to a receiving user, regardless of whether the receiving user is viewing that ephemeral message 902 inside or outside the context of an ephemeral message group 904.

The ephemeral timer system 202 may furthermore operationally remove a particular ephemeral message 902 from the ephemeral message group 904 based on a determination that it has exceeded an associated group participation parameter 912. For example, when a sending user has established a group participation parameter 912 of 24 hours from posting, the ephemeral timer system 202 will remove the relevant ephemeral message 902 from the ephemeral message group 904 after the specified 24 hours. The ephemeral timer system 202 also operates to remove an ephemeral message group 904 when either the group participation parameter 912 for each and every ephemeral message 902 within the ephemeral message group 904 has expired, or when the ephemeral message group 904 itself has expired in terms of the group duration parameter 908.

In certain use cases, a creator of a particular ephemeral message group 904 may specify an indefinite group duration parameter 908. In this case, the expiration of the group participation parameter 912 for the last remaining ephemeral message 902 within the ephemeral message group 904 will determine when the ephemeral message group 904 itself expires. In this case, a new ephemeral message 902, added to the ephemeral message group 904, with a new group participation parameter 912, effectively extends the life of an ephemeral message group 904 to equal the value of the group participation parameter 912.

Responsive to the ephemeral timer system 202 determining that an ephemeral message group 904 has expired (e.g., is no longer accessible), the ephemeral timer system 202 communicates with the messaging system 100 (and, for example, specifically the messaging client 104) to cause an indicium (e.g., an icon) associated with the relevant ephemeral message group 904 to no longer be displayed within a user interface of the messaging client 104. Similarly, when the ephemeral timer system 202 determines that the message duration parameter 906 for a particular ephemeral message 902 has expired, the ephemeral timer system 202 causes the messaging client 104 to no longer display an indicium (e.g., an icon or textual identification) associated with the ephemeral message 902.

Figure 10:
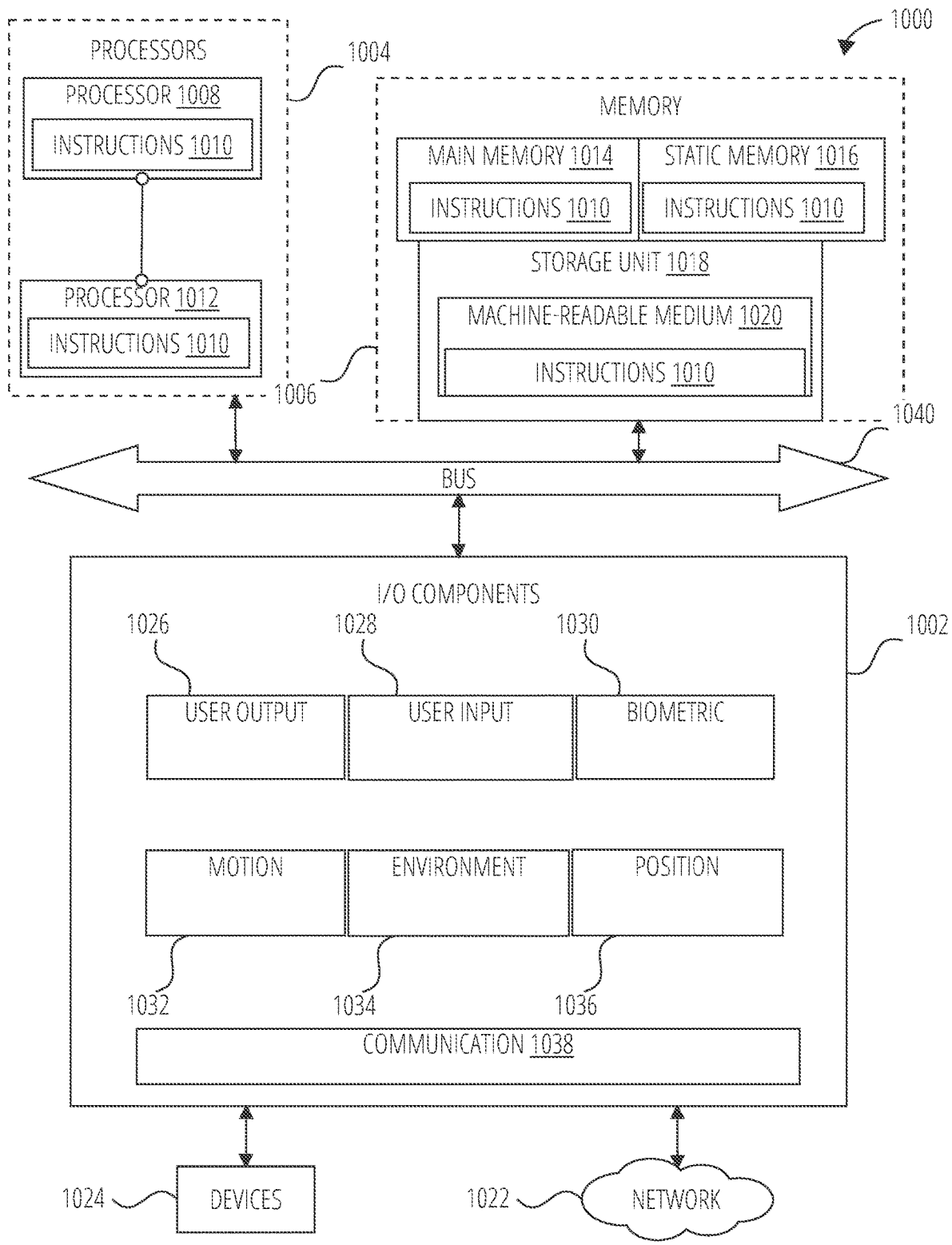
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Figure 11:
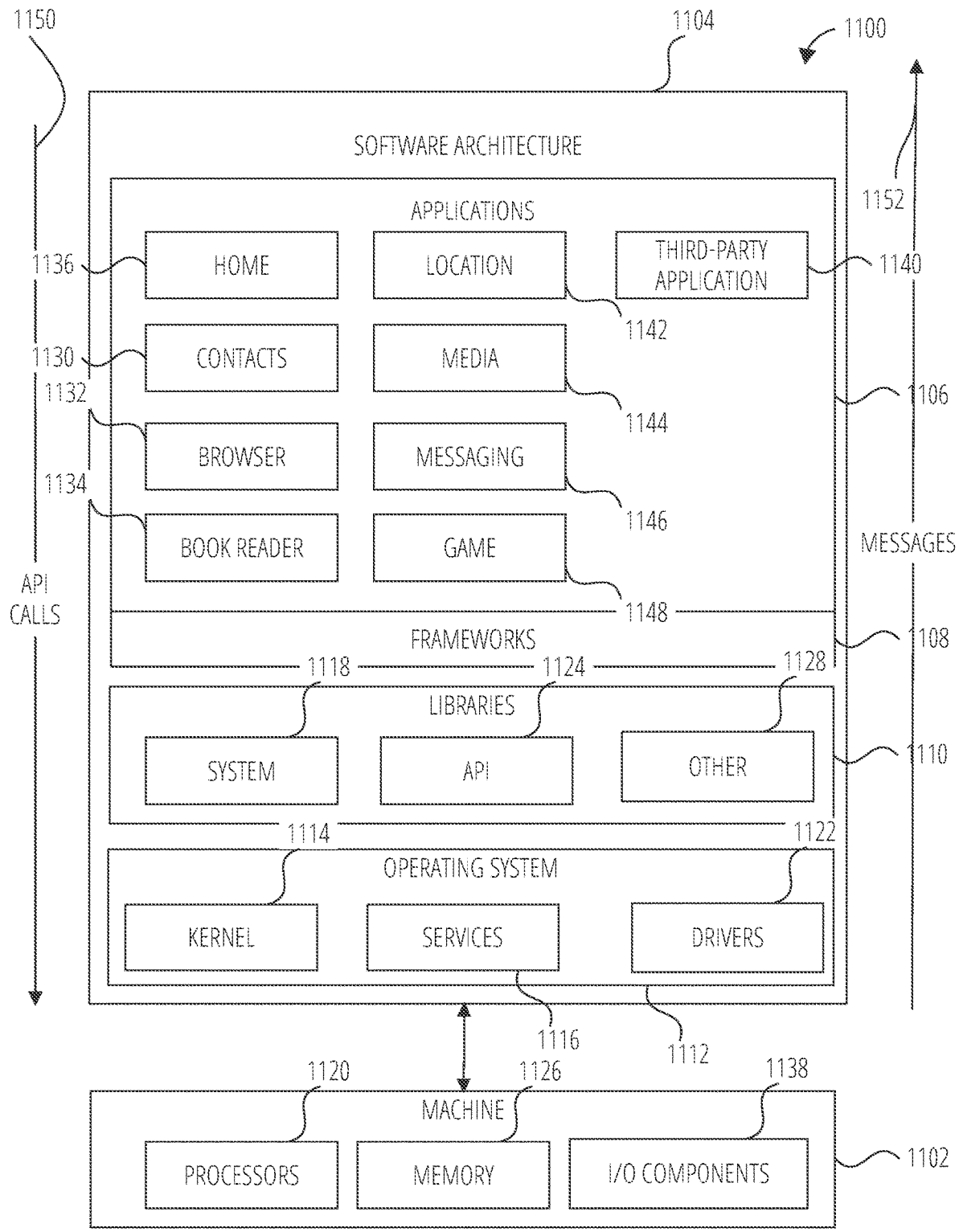
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium"

mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
providing, on a device of a user, a first user interface including a first section for contributing to one of plural incentive-based content feeds, each incentive-based content feed being represented by a respective icon which is user-selectable to add media to the incentive-based content feed;
receiving, from the device, an indication of user selection of the respective icon representing a first incentive-based content feed of the plural incentive-based content feeds;
receiving, from the device and based on receiving the indication, a request for adding a media content item to the first incentive-based content feed, the first incentive-based content feed being provided by a messaging application and being associated with an incentive program providing for user payout based on meeting first content criteria;
determining, based on receiving the request, that the media content item meets the first content criteria;
determining, by accessing a machine learning classifier, that the media content item meets second content criteria for filtering out high-probability violating content, the machine learning classifier being configured to classify the media content item based on predefined content violation types and to automatically filter out the high-probability violating content;
adding, in response to determining that the media content item meets first content criteria and the second content criteria, the media content item to a set of media content items which meet the first content criteria and the second content criteria, and which are available via the first incentive-based content feed;
causing, on plural devices corresponding to respective users of the messaging application, display of a second user interface for interacting with the set of media content items;
selecting, based on user interaction with the media content item via the second user interface, the media content item from among the set of media content items for the user payout; and
providing, based on the selecting, the user payout to the user.

2. The method of claim 1, wherein each of the plural incentive-based content feeds is assigned a respective user payout.

3. The method of claim 1, further comprising:
receiving indication of a user selection of the user-selectable icon corresponding to the set of media content items from among the plurality of sets of media content items; and
providing display of an awards page for the set of media content items, the awards page depicting a ranked list of user-selectable cells, each user-selectable cell corresponding to a respective media content item within the set of media content items.

4. The method of claim 1, further comprising:
setting an expiration date for submission of additional media content items to the set of media content items, the expiration date having been specified by an administrator.

5. The method of claim 1, further comprising:
receiving, prior to receiving the request, indication of the first content criteria as specified by an administrator.

6. The method of claim 5, wherein meeting the first content criteria requires the media content item to include predefined sound content specified by the administrator.

7. The method of claim 5, wherein meeting the first content criteria requires the media content item to include predefined third-party app content specified by the administrator.

8. The method of claim 5, further comprising:
causing the device to display a notification that the first content criteria requires the media content item to include predefined location metadata specified by the administrator.

9. The method of claim 5, wherein the selecting is based at least in part on human review of the set of media content items with respect to adherence to a distribution policy, the distribution policy including requirements related to at least one of user data privacy, content rights or monetization eligibility.

10. The method of claim 1, wherein the first content criteria requires the media content item to be generated using a first augmented reality content item preselected from among plural available augmented reality content items.

11. The method of claim 1, wherein the first user interface further includes at least one second section for contributing to one of plural non-incentive-based content feeds, each non-incentive-based content feed being represented by a respective icon which is user-selectable to add media to the non-incentive-based content feed.

12. The method of claim 1, wherein the machine learning classifier is further configured to detect duplicate submissions through content fingerprinting, to remove low-quality media content, and to prioritize high-quality submissions for viewer distribution.

13. A system comprising:
a processor; and
a memory storing instructions that, when executed by the processor, configure the processor to perform operations comprising:
providing, on a device of a user, a first user interface including a first section for contributing to one of plural incentive-based content feeds, each incentive-based content feed being represented by a respective icon which is user-selectable to add media to the incentive-based content feed;

receiving, from the device, an indication of user selection of the respective icon representing a first incentive-based content feed of the plural incentive-based content feeds;

receiving, from the device and based on receiving the indication, a request for adding a media content item to the first incentive-based content feed, the first incentive-based content feed being provided by a messaging application and being associated with an incentive program providing for user payout based on meeting first content criteria;

determining, based on receiving the request, that the media content item meets the first content criteria;

determining, by accessing a machine learning classifier, that the media content item meets second content criteria for filtering out high-probability violating content, the machine learning classifier being configured to classify the media content item based on predefined content violation types and to automatically filter out the high-probability violating content;

adding, in response to determining that the media content item meets first content criteria and the second content criteria, the media content item to a set of media content items which meet the first content criteria and the second content criteria, and which are available via the first incentive-based content feed;

causing, on plural devices corresponding to respective users of the messaging application, display of a second user interface for interacting with the set of media content items;

selecting, based on user interaction with the media content item via the second user interface, the media content item from among the set of media content items for the user payout; and providing, based on the selecting, the user payout to the user.

14. The system of claim 13, wherein each of the plural incentive-based content feeds is assigned a respective user payout.

15. The system of claim 13, the operations further comprising:

receiving indication of a user selection of the user-selectable icon corresponding to the set of media content items from among the plurality of sets of media content items; and providing display of an awards page for the set of media content items, the awards page depicting a ranked list of user-selectable cells, each user-selectable cell corresponding to a respective media content item within the set of media content items.

16. The system of claim 13, the operations further comprising:

setting an expiration date for submission of additional media content items to the set of media content items, the expiration date having been specified by an administrator.

17. The system of claim 13, the operations further comprising:

receiving, prior to receiving the request, indication of the first content criteria as specified by an administrator.

18. A non-transitory computer-readable storage medium, the computer-readable storage medium including instructions that when executed by a computer, cause the computer to perform operations comprising:

providing, on a device of a user, a first user interface including a first section for contributing to one of plural incentive-based content feeds, each incentive-based content feed being represented by a respective icon which is user-selectable to add media to the incentive-based content feed;

receiving, from the device, an indication of user selection of the respective icon representing a first incentive-based content feed of the plural incentive-based content feeds;

receiving, from the device and based on receiving the indication, a request for adding a media content item to the first incentive-based content feed, the first incentive-based content feed being provided by a messaging application and being associated with an incentive program providing for user payout based on meeting first content criteria;

determining, based on receiving the request, that the media content item meets the first content criteria;

determining, by accessing a machine learning classifier, that the media content item meets second content criteria for filtering out high-probability violating content, the machine learning classifier being configured to classify the media content item based on predefined content violation types and to automatically filter out the high-probability violating content;

adding, in response to determining that the media content item meets first content criteria and the second content criteria, the media content item to a set of media content items which meet the first content criteria and the second content criteria, and which are available via the first incentive-based content feed;

causing, on plural devices corresponding to respective users of the messaging application, display of a second user interface for interacting with the set of media content items;

selecting, based on user interaction with the media content item via the second user interface, the media content item from among the set of media content items for the user payout; and providing, based on the selecting, the user payout to the user.

* * * * *